United States Patent Office 3,512,371
Patented May 19, 1970

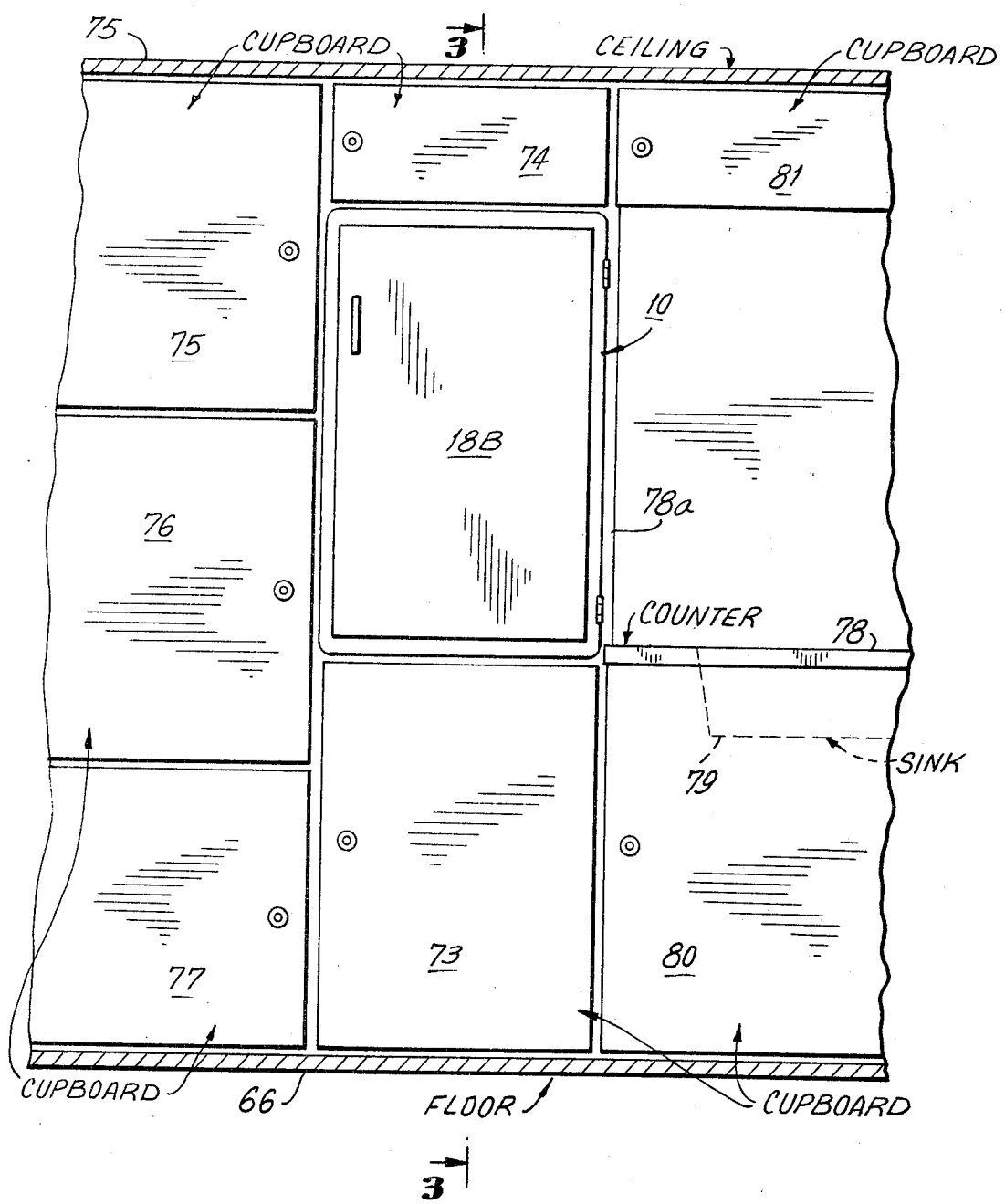

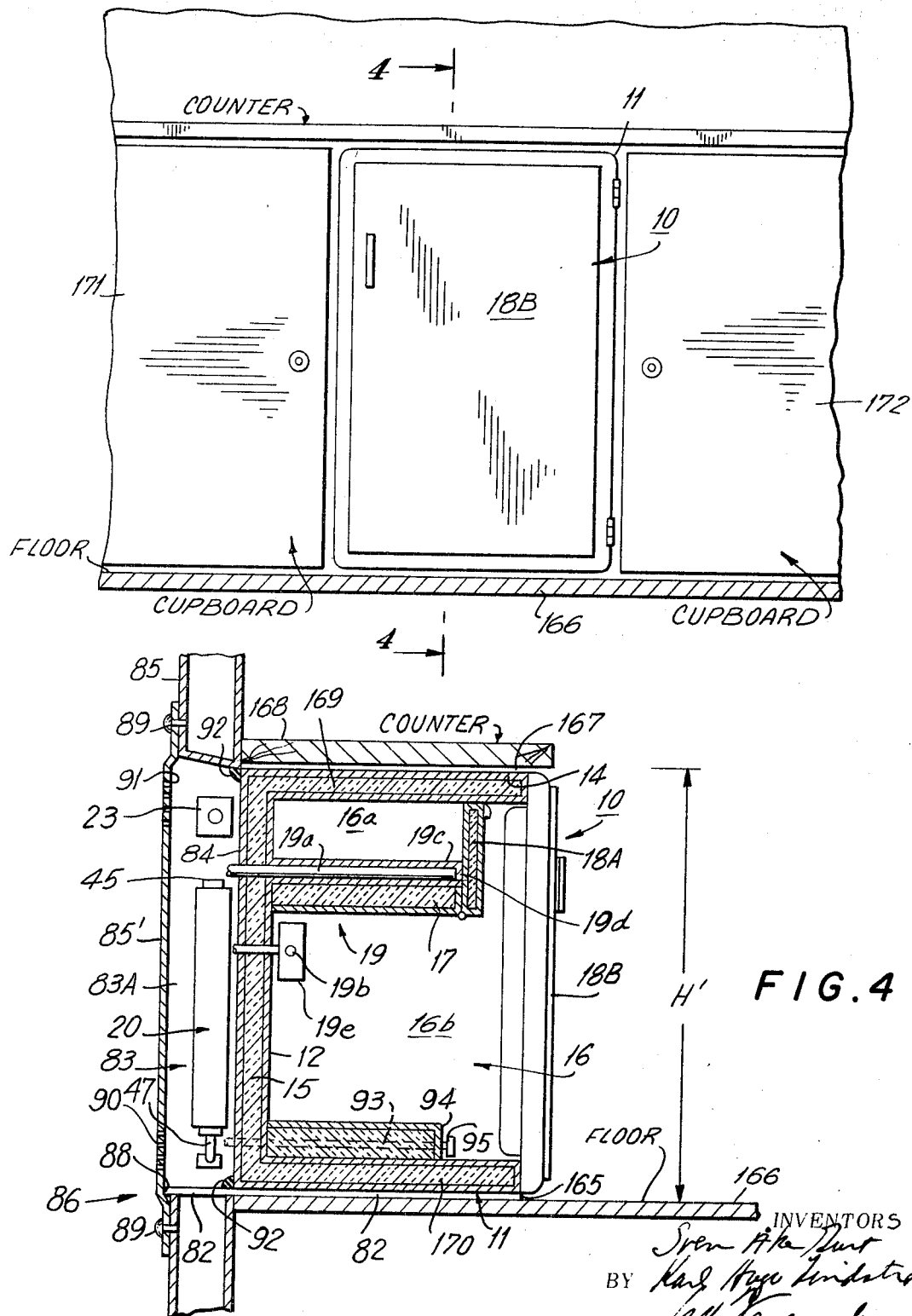

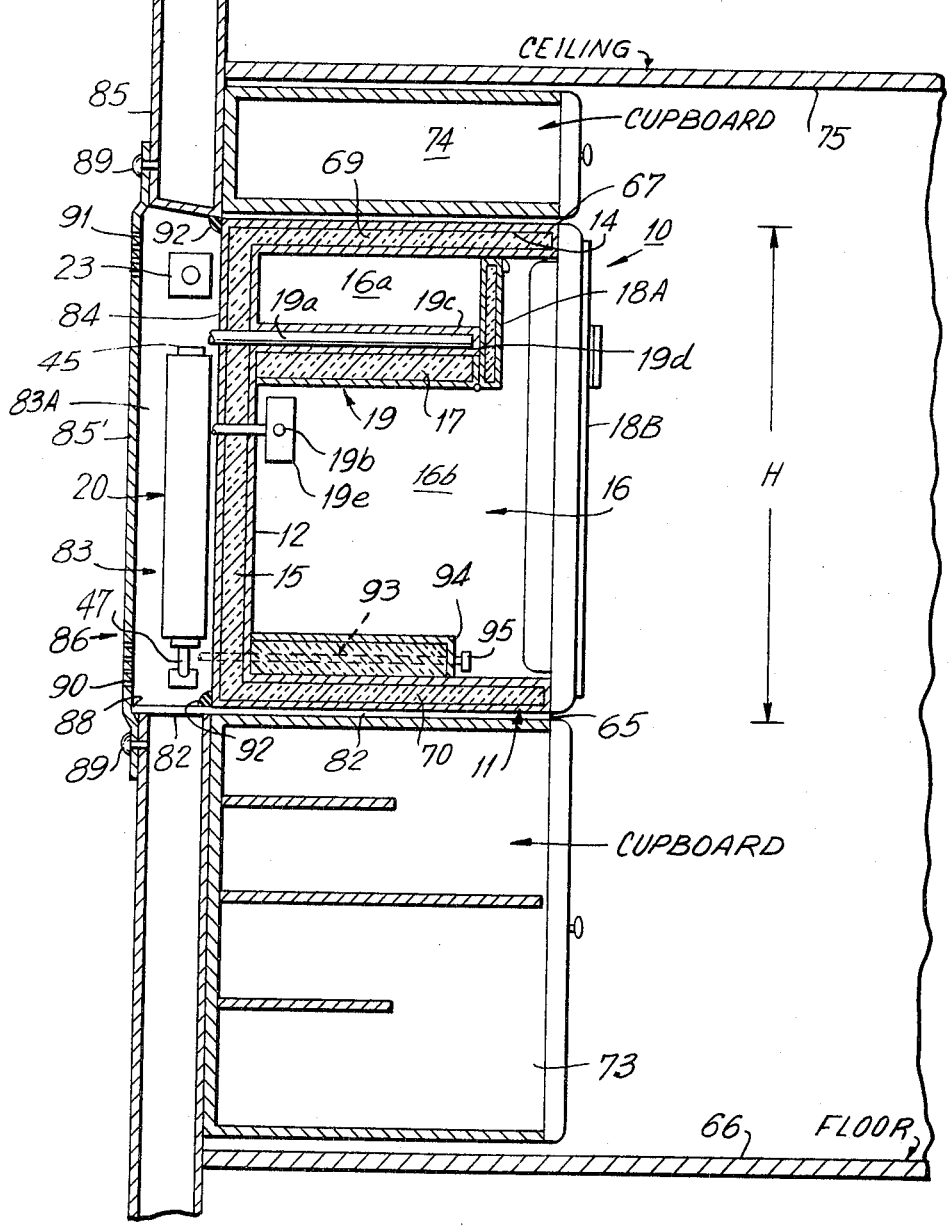

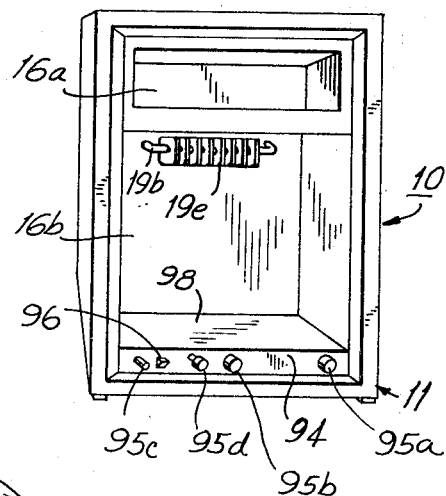
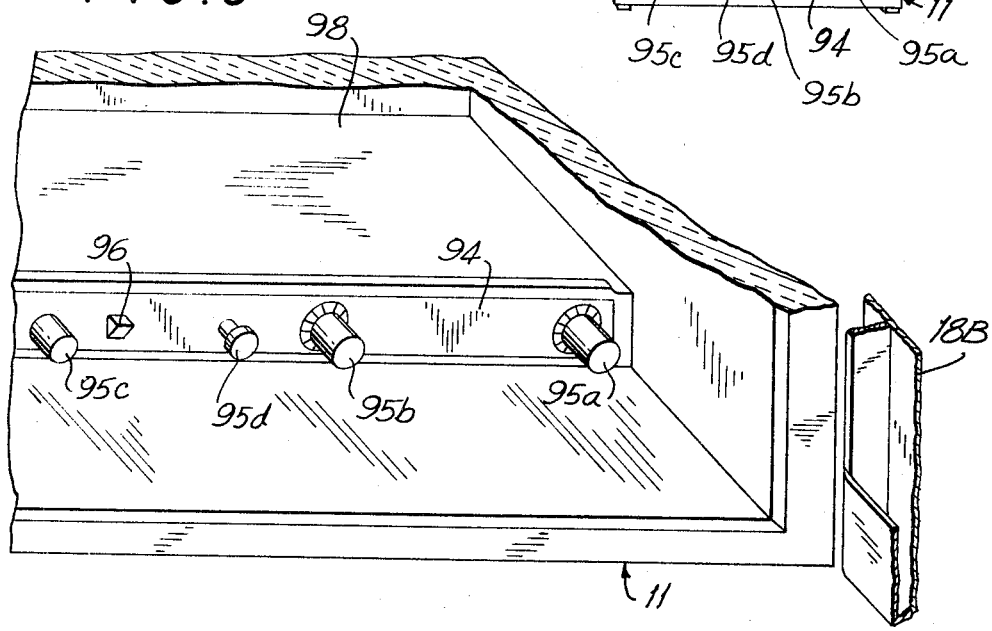
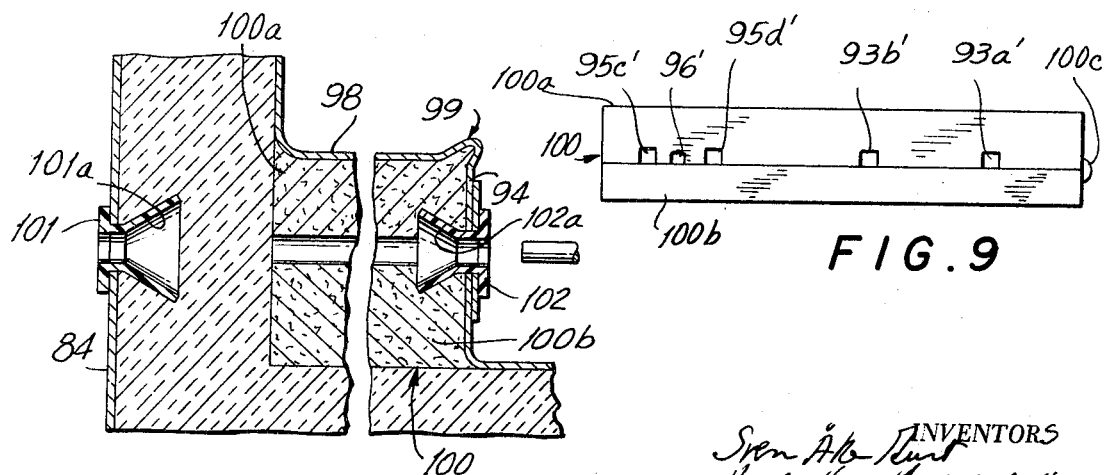

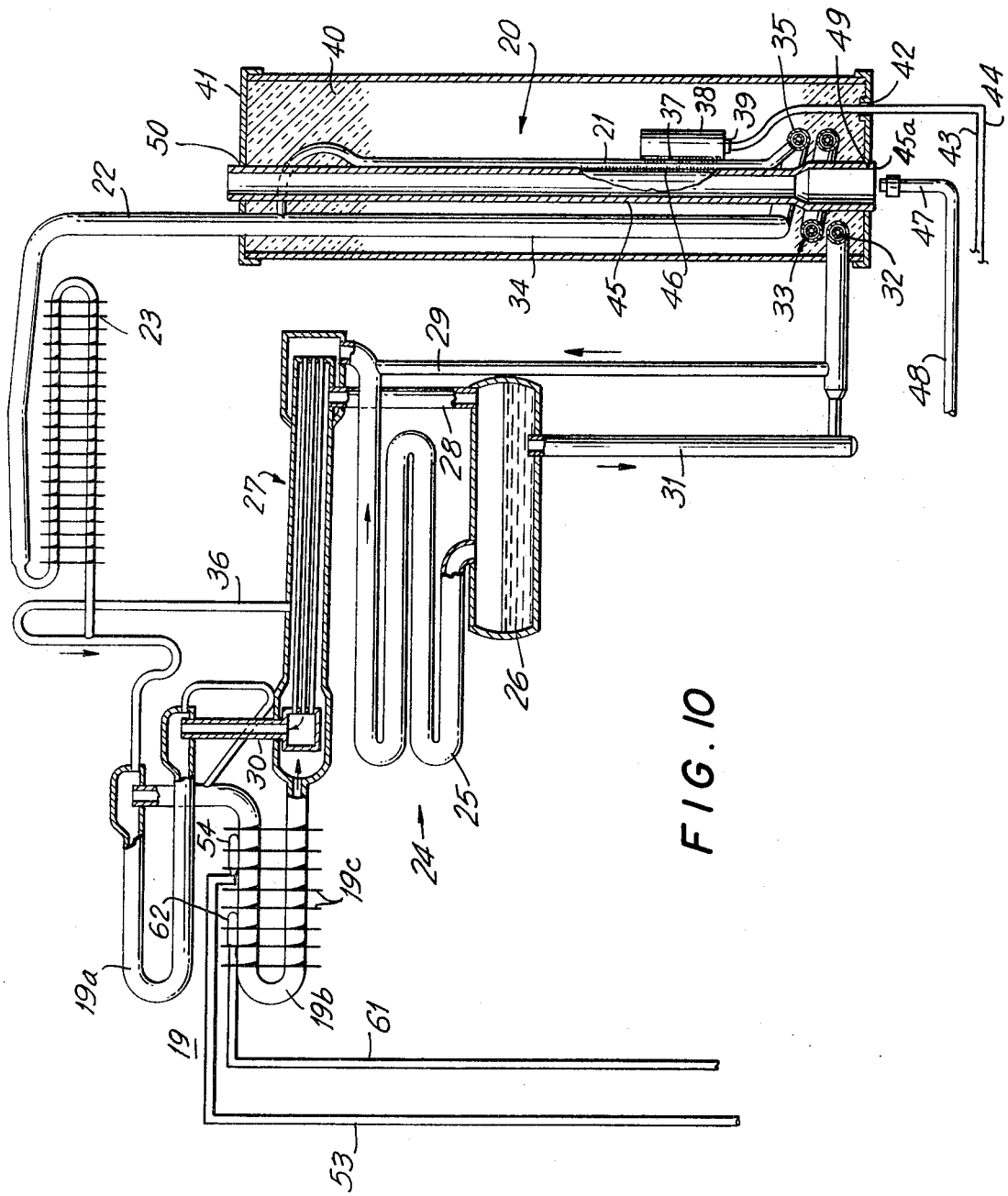

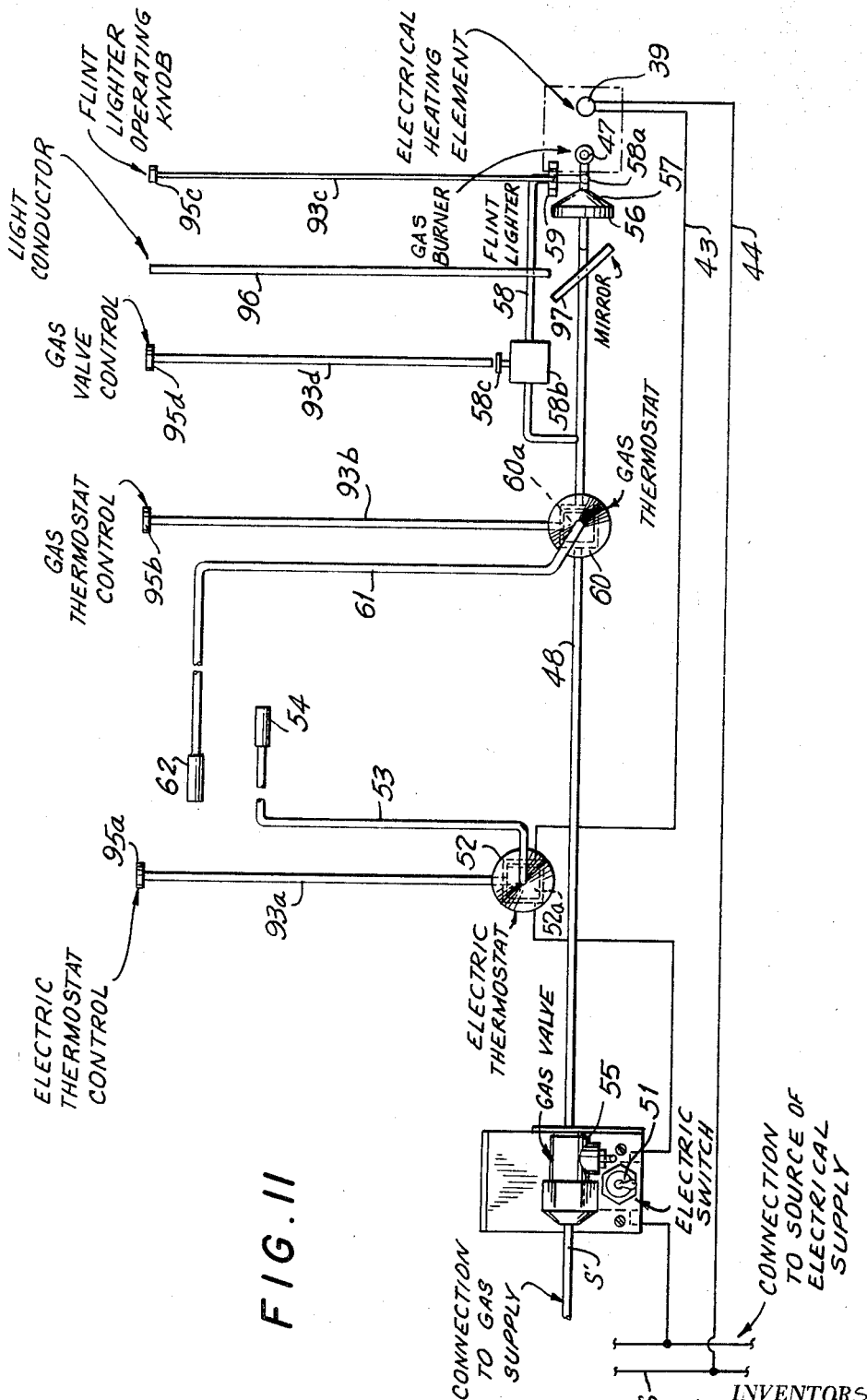

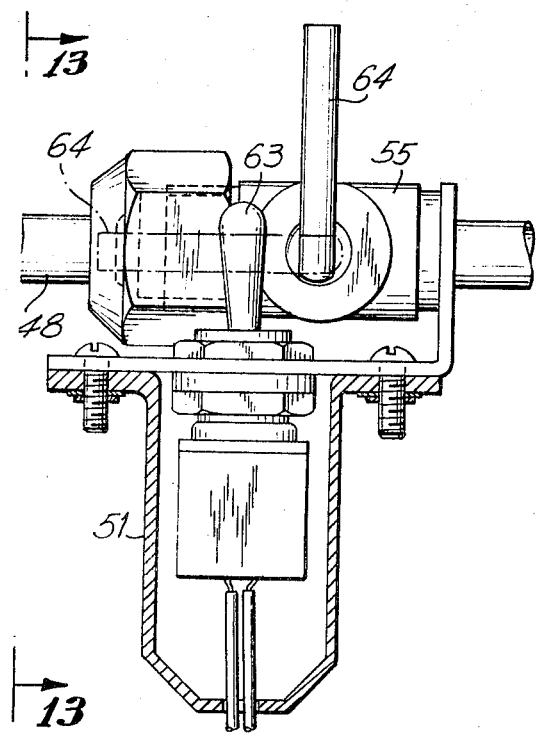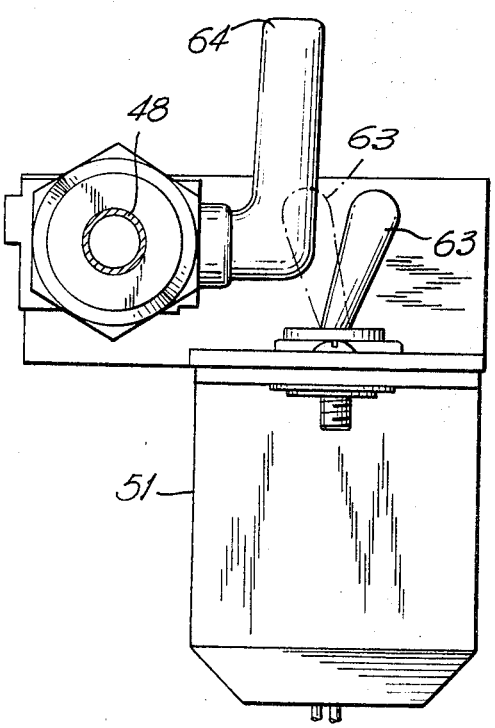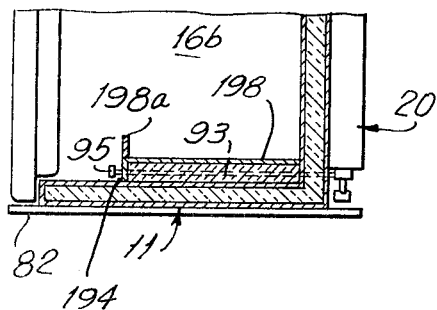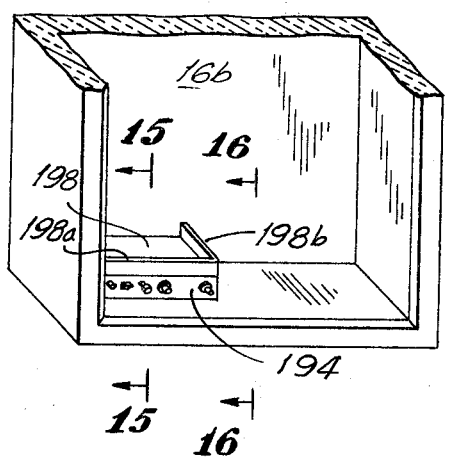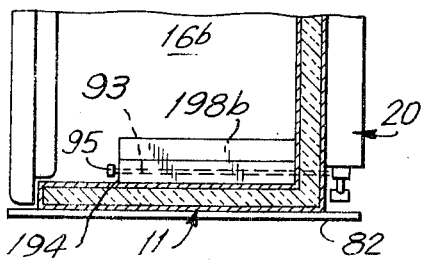

3,512,371
MOBILE HOME HEAT-OPERATED REFRIGERATOR
Sven Åke Gurt, Solna, and Karl Hugo Lindström, Sollentuna, Sweden, assignors to Aktiebolaget Electrolux, Stockholm, Sweden, a corporation of Sweden
Filed June 4, 1968, Ser. No. 734,446
Claims priority, application Sweden, June 7, 1967, 8,025/67
Int. Cl. F25b 15/00
U.S. Cl. 62—148                             17 Claims

ABSTRACT OF THE DISCLOSURE

An absorption refrigerator operated by a gaseous fuel burner connected to a source of supply of gaseous fuel by a conduit in which one or more controls are provided, positioning the burner and conduit and controls at the rear of the refrigerator cabinet at a level above the bottom thereof to enable the cabinet to be mounted in a space of a mobile home with the horizontal exterior wall defining the bottom of the cabinet at a first level from which the space extends vertically upward, mechanism operatively associated with each of the controls at the rear of the cabinet which includes an elongated part extending forward through the rear insulated wall of the cabinet at a level above the lowest portion of the bottom insulated wall thereof, and a member at the forward end of the part for manually manipulating the mechanism to operate the control, such manual manipulating member being accessible from the front of the cabinet.

BACKGROUND OF THE INVENTION

Field of the invention

Refrigerators for mobile homes are subject to certain regulations which are not required for refrigerators installed in kitchens of conventional homes. When heat-operated refrigerators are installed in mobile homes, for example, it is often necessary to cool the heat rejecting parts of the refrigeration apparatus by cooling air circulating in a passageway having an air inlet and an air outlet communicating with outside atmospheric air and out of physical contact with air in the living area of the mobile home. When heat-operated refrigerators are operated by gas, the air for supporting combustion of the gaseous fuel and the heated products of combustion usually must flow in the aforementioned passageway which, as just stated, is out of physical contact with the air in the living area of the mobile home.

When heat-operated refrigerators are installed in kitchens of conventional homes, air for supporting combustion of gaseous fuel and air for cooling heat rejecting parts of the refrigeration apparatus and the heated products of combustion usually flow in a passageway having a vertical portion at the rear of the cabinet and horizontal portions which extend forward therefrom to the front of the cabinet and are disposed above and below the latter, the air inlet and air outlet being at the front of the cabinet at the forward ends of the horizontal portions of the passageway. The controls for the refrigerator usually are located in the rear of the lower horizontal portion of the passageway. When heat-operated refrigerators of this kind are of the built-in type, it is necessary to remove the refrigerator from the wall space in which it is installed in order to inspect and service parts of the refrigeration apparatus and controls positioned at the rear of the cabinet and the rear part of the lower horizontal portion of the passageway.

In mobile homes it is necessary to install heat-operated refrigerators at an exterior wall to provide the air passageway referred to above which is in communication with the outside atmospheric air and out of physical contact with air in the living area of the mobile home. In order to adjust and service the parts of the refrigeration apparatus at the rear of the refrigerator it is necessary to provide an opening in the exterior wall and a removable closure member to close the opening. Heat-operated refrigerators for mobile homes have retained the characteristics of similar refrigerators for kitchens of conventional homes in that the burners and gas supply lines and controls are located in spaces below the cabinet proper so that the refrigerators can be inspected and repaired without difficulty. In heat-operated refrigerators of the kind heretofore available, therefore, the overall height of the refrigerator is materially greater than the height of the thermally insulated interior thereof. Further, the volume of the thermally insulated interior of the refrigerator is materially less than the size of the container required to ship the refrigerator, which is objectionable.

SUMMARY OF THE INVENTION

Our invention relates to heat-operated refrigerators for mobile homes, such as trailers and campers, for example, and more particularly to refrigerators of this kind provided with absorption refrigeration apparatus operable by gas alone or alternatively by gas and electricity.

It is an object of our invention to provide in a kitchen unit of a mobile home a heat-operated refrigerator having a thermally insulated interior of maximum volume for installation in a space of a given height.

Another object is to provide a heat-operated refrigerator of this kind in which the inspection and repair of the controls of the refrigeration apparatus are facilitated.

A further object is to provide a heat-operated refrigerator of this kind in which the mechanism for operating the controls are protected from damage during shipping and handling.

A still further object is to provide a refrigerator of this kind in which the controls are located at the rear of the cabinet at a level above the bottom thereof and mechanism for operating the controls which includes manually operable knobs accessible from the front of the cabinet, such mechanism including elongated parts which extend forward through the rear insulated wall of the cabinet at a level above the lowest portion of the bottom insulated wall of the cabinet.

Further objects and advantages of our invention will become apparent as the following description proceeds, and the features of novelty which characterize our invention will be pointed out with particularity in the claims annexed to and forming a part of this specification.

BRIEF DESCRIPTION OF THE DRAWING

FIGS. 1 and 2 are fragmentary front elevations of kitchen units in mobile homes, each of which includes a mobile home refrigerator embodying our invention;

FIGS. 3 and 4 are vertical sectional views taken at lines 3—3 and 4—4, respectively, of FIGS. 1 and 2;

FIG. 5 is a front perspective view of the refrigerators shown in FIGS. 1 and 2, with the outer and inner doors removed;

FIG. 6 is an enlarged fragmentary perspective view of the bottom part of the refrigerators shown in FIGS. 3 and 4, the outer door being in its open position;

FIG. 8 is an enlarged fragmentary vertical sectional view of the bottom part of the refrigerators shown in FIGS. 3 and 4;

FIG. 9 is an enlarged fragmentary front elevation of details shown in FIG. 8;

FIG. 10 is a view diagrammatically illustrating by way of example an absorption refrigeration system of the inert gas type which may be employed in the refrigerators shown in the preceding figures;

FIG. 11 is a view diagrammatically illustrating the controls shown in FIGS. 6 and 7 for the refrigeration system illustrated in FIG. 10;

FIG. 12 is an enlarged front elevational view, partly in section, of control details shown in FIGS. 7 and 11;

FIG. 13 is a vertical sectional view taken at line 13—13 of FIG. 12;

FIG. 14 is a fragmentary perspective view similar to FIG. 6 illustrating a modification of our invention; and FIGS. 15 and 16 are fragmentary vertical sectional views taken at lines 15—15 and 16—16 of FIG. 14.

DESCRIPTION OF THE PREFERRED EMBODIMENTS

Figure 7:
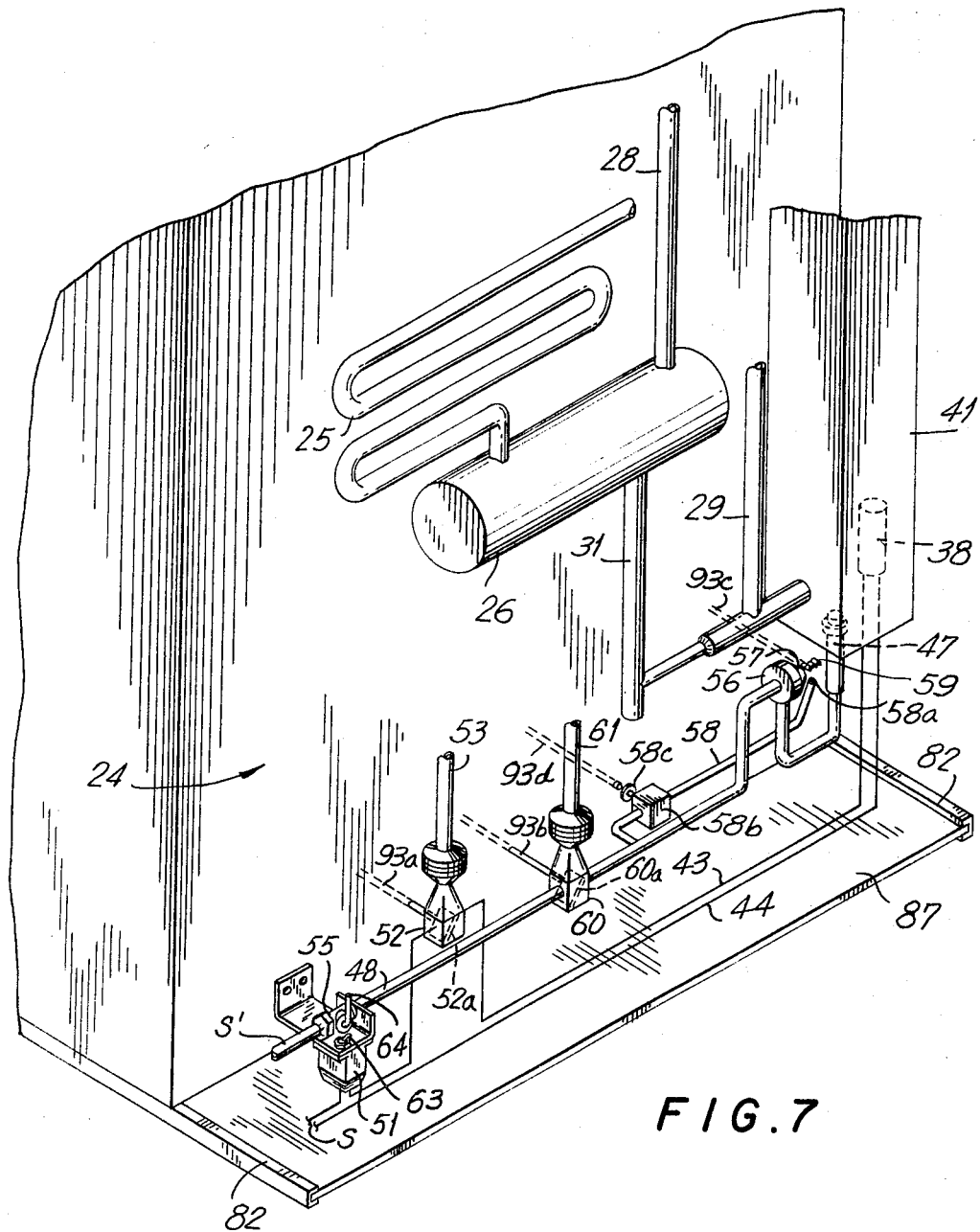
FIG. 7 is a fragmentary rear perspective view of the refrigerators shown in FIGS. 3 and 4.

Referring to FIGS. 1 to 4, we have shown our invention in connection with a mobile home refrigerator 10 comprising a cabinet 11 having an inner liner or shell 12 arranged within an outer shell 14 and insulated therefrom with any suitable insulating material 15, such as foamed plastic, for example. The inner shell 12 defines the thermally insulated interior 16 of the cabinet 11 which is divided by a horizontal insulated partition 17 to provide a freezer compartment 16a and a food compartment 16b for storing foods at a higher temperature than in the compartment 16a and preferably at a temperature above 32° F. Access to the compartment 16a is afforded at a front opening adapted to be closed by an inner door 18A which is located within the cabinet interior 16 and hinged in any suitable manner (not shown) at its lower edge to the front of the partition 17. Access to the thermally insulated interior 16 of the cabinet 11 is afforded at the front opening adapted to be closed by an outer insulated door 18B hinged in any suitable manner (not shown) at the front of the cabinet 11.

A cooling unit or evaporator structure 19 of heat-operated refrigeration apparatus is disposed within the cabinet interior 16. The cooling unit 19 includes a low temperature cooling section 19a disposed within the freezer compartment 16a and a higher temperature cooling unit section 19b disposed within the compartment 16b. Although we do not wish to be limited thereto, the heat-operated refrigeration apparatus may be of a uniform pressure absorption type which is well known in the art. In refrigeration apparatus of this type, the cooling unit 19 is connected to other parts, including a generator 20, which is mounted on the cabinet 11 and positioned at the rear thereof.

In heat-operated refrigeration apparatus of this kind refrigerant vapor is expelled from absorption liquid in a vapor lift pipe 21 of the generator 20, as shown in FIG. 10. The expelled refrigerant vapor passes through a conduit 22 to a condenser 23. The refrigerant vapor is liquefied in the condenser 23 and flows into the cooling unit 19 in which the refrigerant evaporates and diffuses into an inert gas to produce a refrigerating effect. The resulting gas mixture of refrigerant and inert gas flows from the cooling unit 19 to an absorber 24 which may be of an air-cooled type including a coil 25 and an absorber vessel 26 to which the lower end of the coil is connected, such gas mixture entering the absorber vessel 26 through a heat exchanger 27 and a conduit 28.

In the absorber 24 refrigerant is absorbed from the gas mixture into absorption liquid which is delivered thereto through a conduit 29, and the absorption liquid enriched in refrigerant passes into the absorber vessel 26. The inert gas is returned from the absorber 24 to the cooling unit 19 in a path of flow including the heat exchanger 27 and a conduit 30, and the enriced absorption liquid is conducted through a conduit 31 and inner pipe 32 of a liquid heat exchanger 33 to the generator 20.

The absorption liquid raised in vapor lift pipe 21 and from which refrigerant vapor has been expelled flows by gravity from a standpipe 34 through the outer pipe 35 of liquid heat exchanger 33 and conduit 29 into the upper part of absorber coil 25. A vent conduit 36 connects the lower end of the condenser 23 and the passage of the liquid heat exchanger 27 through which the gas mixture flows from the cooling unit 19.

Absorption solution enriched in refrigerant flows from the absorber vessel 26 through the liquid heat exchanger 33 into the lower end of vapor lift pipe 21 which is in thermal exchange relation at 37 with a heating tube 38. The heating tube 38 is arranged to be heated by an electrical heating element 39 disposed within the tube. Vapor generated in the vapor lift tube 21 by heating effected by the heating tube 38 raises liquid therein by vapor lift action and flows from the upper end thereof through the upper part of standpipe 34 into conduit 22 and passes to the condenser 23, as previously explained.

The generator 20 in its entirety, together with a major portion of the liquid heat exchanger 33, are embedded in a body of insulation 40 retained in a metal shell or casing 41 having an opening 42 at the bottom thereof. Electrical conductors 43 and 44 for the electrical heating element 39 pass through the bottom opening 42 of the shell 41 and extend through the insulation 40. The heating tube 38 snugly receives the heating element 39 which may comprise a cartridge housing an electrical wire or the like having a relatively high resistance that generates heat when connected to a source of electrical energy.

As best shown in FIG. 10, the generator 20 is arranged to be operated by two independent sources of heat, each of which alone is capable of supplying heat at an adequate rate and at a sufficiently elevated temperature to the vapor lift pipe 21 to effect normal operation of the refrigeration apparatus. Accordingly, a second heating flue 45 is provided which is in thermal exchange relation at 46 with the vapor lift pipe 21. A fluid fuel burner 47 is arranged to be supported in an upright position at the bottom part 45a of the heating flue, so that combustion gases will be used most effectively for heating the heating flue 45. The burner 47 is connected to a source of supply of gaseous fuel by a pipe 48. The vapor lift pipe 21 of the generator 20 constitutes the heat receiving member of the refrigerating apparatus. The lower end of the heating flue 45 projects downward through an opening 49 in the bottom of the shell 41, and the upper end of the flue 45 projects upward through an opening 50 in the top of the shell 41.

The low temperature cooling section 19a may be in the form of a looped coil positioned horizontally at the bottom of the freezer compartment 16a and extend from one lateral side to the opposite lateral side thereof. The looped coil may be heat-conductively connected to the bottom of a plate 19c having a downward extending flange 19d at the front edge of the coil to conceal the latter from view. The higher temperature cooling section 19b may comprise a length of horizontal piping which is adjacent to the rear wall of the food compartment 16b and below the partition 17. A plurality of vertically disposed fins 19e may be fixed to the piping of the higher temperature cooling section 19b to provide a relatively extensive heat transfer surface to promote cooling of air flowing in thermal exchange relation therewith. The generator 20, which is enveloped by its outer shell 41, condenser 23, absorber coil 25 and absorber vessel 26 are disposed at the rear of the cabinet 11, as best shown in FIGS. 3, 4 and 7. The condenser 23, absorber 25, and absorber coil 26 are air-cooled in a manner that will be described hereinafter.

When refrigeration apparatus like that illustrated in FIG. 10 is intended to be operated electrically, the electrical conductors 43 and 44 are connected to a source S of electrical energy by a switch 51 connected in the conductor 43, as shown in FIG. 11. An electric thermostat 52 desirably is connected in the conductor 43 to control the temperature at which it is desired to maintain the higher temperature food compartment 16b. The electric thermostat 52 is provided with a capillary tube 53 and thermal sensitive bulb 54 adapted to contain a suitable volatile fluid, the bulb 54 being arranged to be influenced by the higher temperature cooling section 19b, as diagrammatically shown in FIG. 10. The electric thermostat 52 functions to control the supply of electrical energy to the heating element 39 responsive to a temperature condition affected by the higher temperature cooling section 19b and is provided with a control member 52a to adjust the temperature at which it is desired to maintain the higher temperature cooling section 19b.

When the refrigeration apparatus of FIG. 10 is intended to be operated by a gaseous fuel, the burner 47 is connected to a source of supply S' of the fuel by the conduit 48 and ignited. A manually operable valve 55 is connected in the conduit 48. The conduit 48 also is provided with a valve 56 having a thermal member 57 associated therewith which functions to keep valve 56 open when a flame is being maintained at the burner 47 and to close valve 56 when the burner flame is extinguished.

The burner 47 is provided with a lighter tube 58 into which gaseous fuel is diverted from the supply conduit 48. The outer free end of the lighter tube 58 terminates at a discharge orifice 58a for maintaining a pilot flame at the vicinity of the thermal member 57. In the lighter tube 58 is provided a valve 58b which is spring-biased to its closed position and can be opened by manipulating a push button 58c. To start the burner 47 valve 55 is opened and the push button 58c then pressed to open valve 58b, whereby gaseous fuel can flow through the lighter tube 58 and the fuel discharged from the orifice 58a can be ignited by a flint lighter 59 in a manner to be described hereinafter. In this manner a pilot flame is produced at the discharge orifice 58a which functions to heat the thermal member 57. When the latter is heated sufficiently, it in turn functions to open valve 56 and supply fuel to the burner 47 which is ignited by the pilot flame, whereupon the push button 58c may be released to close valve 58b and shut-off the pilot flame.

A gas thermostat 60 desirably is connected in the conduit 48 to control the temperature at which it is desired to maintain the higher temperature food compartment 16b. The gas thermostat 60 is provided with a capillary tube 61 and thermal sensitive bulb 62 adapted to contain a suitable volatile fluid, the bulb 62 being arranged to be influenced by the higher temperature cooling section 19b, as diagrammatically shown in FIG. 10. The gas thermostat 60 functions to control the supply of gaseous fuel to the burner 47 responsive to a temperature condition affected by the higher temperature cooling section 19b and is provided with a control member 60a to adjust the temperature at which it is desired to maintain the higher temperature cooling section 19b. The gas thermostat 60 embodies valve structure which desirably functions to supply gas to the burner either at a "maximum" rate or a "minimum" rate. When gas is supplied to the burner 47 at the "maximum" rate, the burner will function to supply heat at an elevated temperature and at a rate adequate to effect normal operation of the refrigeration apparatus in the manner described above. When gas is supplied to the burner 47 at the "minimum" rate, the burner will supply heat at a low rate and at a temperature which is materially below the aforementioned elevated temperature and inadequate to effect normal operation of the refrigeration apparatus.

It is desirable to protect the refrigeration apparatus so that, when the apparatus is connected to one of the sources of heat, the apparatus cannot be connected to the other source of heat. As best shown in FIGS. 12 and 13, this is accomplished by providing the switch 51 which is of the "snap-acting" type and provided with an independent operating member 63 manually movable back and forth between the solid and dotted line positions illustrated in FIG. 13. The gas valve 55 is provided with an apertured turnable plug (not shown) to which is connected an operating member 64 manually movable between the solid and dotted line positions illustrated in FIG. 12.

Let us assume that the refrigeration apparatus is connected to the electrical source of supply S with the switch 51 closed and its operating member 63 in the dotted line position in FIG. 13 and with the gas valve 55 closed and its operating member 64 in the vertical solid line position in FIG. 12. Under these conditions the switch operating member 63 in dotted lines in FIG. 13 is in front of the gas valve operating member 64 and in the path of movement of the latter, thus physically blocking and preventing movement of the operating member 64 in a counterclockwise direction in FIG. 12.

Let us now assume that the refrigeration apparatus is connected to the source of supply S' of gaseous fuel with the gas valve 55 open and its operating member 64 in the horizontal dotted line position in FIG. 12 and with the switch 51 open and its operating member 63 in the solid line position in FIG. 13. Under these conditions the gas valve operating member 64 in dotted lines in FIG. 12 is in back of the switch operating member 63 and in the path of movement of the latter, thus physically blocking and preventing rearward movement of the operating member 63 to its dotted line position in FIG. 13, whereby the member 63 cannot move to its switch closed position. Hence, it is always necessary to manually move one of the independently operable switch and gas valve operating members 63 and 64 to its inoperative position before the other of the independently operable switch and gas valve operating members can be moved to its operative position.

In accordance with our invention, in order to provide in a kitchen unit of a mobile home a refrigerator having a thermally insulated interior of maximum volume for a space of a given height, the gas burner 47 and gaseous fuel supply conduit 48 and controls 55, 56, 57, 58b and 60 connected in conduit 48 are disposed at the rear of the cabinet 11 at a level above the bottom thereof to enable the cabinet to be mounted in a vertically extending space of the mobile home with the horizontal exterior wall of the outer shell 14, which defines the bottom of the cabinet, at a first level from which the space extends vertically upward.

As best seen in FIG. 7, the gas burner 47, gas supply conduit 48 and controls 55, 56, 57, 58b and 60 connected in the conduit 48, which are at the rear of the cabinet 11 are at a level above the bottom of the cabinet. In FIG. 3 the vertically extending wall space in which the refrigerator 10 is positioned extends upward from a first level 65; and in FIG. 4 the vertically extending wall space in which a similar refrigerator 10 is positioned extends upward from a first level 165. Hence, the thermally insulated interiors of the refrigerators 10 in FIGS. 3 and 4 are vertically spaced from the first levels 65 and 165, respectively, only by the bottom insulated walls of the cabinets 11 and the vertical heights of the wall spaces are efficiently utilized to accommodate refrigerators having thermally insulated interiors of maximum volume for wall spaces of a given height.

As seen in FIGS. 2 and 4, the refrigerator 10 is positioned in a wall space of a mobile home that extends vertically upward from the first level 165, which is at the floor 166, to a second higher level 167 beneath a counter 168. The height of the thermally insulated interior of the cabinet 11 is less than the overall height H' of the cabinet only by the thicknesses of the top and bottom insulated walls 169 and 170, respectively. Further, the refrigerator 10 abuts the cupboards 171 and 172 at each side thereof, as shown in FIG. 2, with the lateral sides of the refrigerator cabinet at the sides of the cupboards defining the wall space.

As seen in FIGS. 1 and 3, a similar refrigerator 10 is positioned in a wall space of a mobile home that extends vertically upward from the first level 65, which is at the top of a cupboard 73 supported on the floor 66. The refrigerator 10 in FIGS. 1 and 3 extends upward in the wall space from the first level 65 to a second higher level 67. A cupboard 74 extends vertically upward from the second higher level 67 to the ceiling 75, in FIG. 3 the height of the thermally insulated interior 16 of the cabinet 11 is less than the overall height H of the cabinet only by the thicknesses of the top and bottom insulated walls 69 and 70, respectively. As seen in FIG. 1, one lateral side of the refrigerator 10 in FIG. 3 abuts the sides of the cupboards 75 and 76 which are disposed one above another and above a third cupboard 77 supported on the floor 66. The opposite lateral side of the refrigerator abuts a vertical wall 78a located at one end of a counter 78. The vertical wall 78a may extend upward from the counter 78 to the bottom of the cupboard 74. The counter 78 may be provided with a sink 79 embodied in a cupboard 80. As seen in FIG. 1, the cupboard 74 positioned above the refrigerator 10 is located adjacent to a similar cupboard 81 above the counter 78.

Each of the refrigerators 10 is positioned in a wall space by spaced elongated members 82 which extend from the rear to the front of the refrigerator. One of the spaced members 82 is shown in each of FIGS. 3 and 4 at the first levels 65 and 165, respectively. As shown in FIG. 7, the spaced members 82 also extend rearward from the rear of each cabinet. The rear ends of the members 82 extend into a vertical passageway 83 defined by the rear exterior wall 84 of the cabinet 11 and a vertical member 85 of an exterior wall 86 of the mobile home, the vertical member 85 being spaced from the rear exterior wall 84 of the refrigerator. The opposing vertical sides of the passageway 83, at each side of the refrigerator 10, may be closed by spaced upright members 83A, one of which is seen in each of FIGS. 3 and 4.

The vertical passageway 83 is closed at its lower end by a sheet 87 of suitable material which is at the first levels 65 and 165, respectively, and carried by the refrigerator positioning members 82. The members 82 may be U-shaped in section to receive and hold the sheet 87, as shown in FIG. 7. The wall member 85 is provided with an opening 88 which may be coextensive with the height and width of the rear of the refrigerator and such opening is closed by a plate 85' which forms a part of the wall member 85 and is removably secured thereto at 89.

The plate 85' is apertured at 90 at a first region at one level which is immediately above the sheet 87 and at 91 at a second region at a higher level. The apertured regions 90 and 91 serve as an air inlet and an air outlet, respectively, for air to flow through the passageway 83 to effect air cooling of the absorber 24 and condenser 23, the heat rejected from the absorber and condenser inducing such upward flow of air by natural draft. Air entering the bottom of the passageway 83 through the air inlet 90 also provides air to support combustion of the gaseous fuel supplied to the burner 47.

The passageway 83 at the rear of the cabinet 11 provides a path of flow for air to effect cooling of the heat rejecting parts of the refrigeration apparatus and a path of flow for the heated products of combustion discharged from the upper end of the heating flue 45. The cooling air and the heated products of combustion are out of physical contact with the air in the living area of the mobile home. The rear of the cabinet 11 may be sealed at its periphery by a suitable sealing material 92, as shown in FIGS. 3 and 4, to insure that the air and products of combustion in the passageway 83 will always be out of physical contact with the air in the living area of the mobile home. The walls defining the passageway 83 may be coated or lined with thermal insulating material in any suitable manner (not shown) to protect them from the heated products of combustion.

In further accord with our invention, suitable mechanism is provided for operating the different control means at the rear of the cabinet by manual manipulating means accessible at the front of the cabinet. We accomplish this by providing mechanism for operating each individual control, such mechanism for a particular control being operatively associated therewith at the rear of the cabinet and including at least one part that extends forward through the rear insulated wall of the cabinet 11 toward the front thereof and between the lateral sides of the cabinet at a level at least above the lowest portion of the bottom insulated wall thereof. Means is provided at the forward end of the one part for manually manipulating the mechanism to operate the control, such manipulating means being accessible from the front of the cabinet 11.

As schematically shown in FIGS. 3 and 4, individual controls at the rear of the cabinet 11 are provided with mechanism like that just described which includes an elongated part 93 that extends forward through the rear insulated wall of the cabinet at a level at least above the lowest portion of the bottom insulated walls 70 and 170, respectively. A vertically extending panel 94 is provided in the thermally insulated interior 16 of the cabinet. The forward end of the elongated part 93 extends through an aperture in the panel 94 and a knob 95 is fixed to the part 93 in front of the panel for manually manipulating the mechanism to operate the control. As seen in FIGS. 3 and 4, the knob 95 is accessible when the door 18B at the front of the cabinet 11 is moved to its open position.

As diagrammatically shown in FIG. 11, the rear end of the elongated part 93a of the mechanism for operating the electric thermostat 52 is operatively associated with its control member 52a. The forward end of the part 93a is provided with a knob 95a. The rear end of the elongated part 93b of the mechanism for operating the gas thermostat 60 is operatively connected with its control member 60a. The forward end of the part 93b is provided with a knob 95b.

The rear end of the elongated part 93c of the mechanism for operating the flint lighter 59 is so constructed and formed that it will be effective to ignite gaseous fuel discharged from the orifice 58a of the lighter tube 58 when rotating movement is imparted to the part 93c. The forward end of the part 93c is provided with a knob 95c. The rear end of the elongated part 93d is operatively associated with the push button 58c of valve 58b. The forward end of the part 93d is provided with a knob 95d which, when pushed rearward, causes the part 93d to coact with push buttons 58c and open valve 58b. When knob 95d is released, the valve 58b will automatically move to its closed position.

In addition to the foregoing mechanisms for operating the controls and first flint lighter 59 at the rear of the cabinet 11, a light conductor 96 extends forward from the rear of the cabinet to the panel 94 at a level at least above the lowest portion of the bottom insulated wall of the cabinet 11. As diagrammatically shown in FIG. 11, a mirror 97 reflects light from the flame produced by the burner 47 to the rear end of the light or optical conductor 96. The forward end of the light conductor 96 extends through an aperture in the panel 94. When the forward end of the light conductor 96 is luminous, this gives a visual indication that the burner 47 is functioning properly during operation of the refrigeration apparatus.

The relative positions of the knobs 95a, 95b, 95c, and 95d and the light conductor 96 on the panel 94 are shown in FIG. 6. The elongated parts 93a, 93b, 93c, and 93d and the light conductor 96 extend forward from the rear of the cabinet 11 beneath a raised platform 98 adjacent to and above the lowest portion of the bottom insulated wall of the cabinet. The platform 98 and panel 94 define a housing 99 which extends from one lateral side wall to the opposite lateral side wall of the inner liner 12 of the cabinet. As best shown in FIG. 8, a body of filling material 100, such as corrugated paper, for example, is retained within the housing 99. The body of filling material 100 may comprise two sections 100a and 100b which are united at 100c at the peripheral joint therebetween and in one of which passageways 93a', 93b', 93c', 93d' and 96' are formed to receive the elongated parts 93a, 93b, 93c, 93d and the light conductor 96.

In order that the aforementioned parts and light conductor will fit snugly within the passageways in the body of filling material 100, bushings 101 and 102 are provided at openings in the panel 94 and rear exterior wall 84 of the cabinet, respectively, which are in alignment with the passageways. The bushings 101 and 102 are provided with funnel-shaped portions 101a and 102a, respectively, which extend inward in the body of filling material 100 and facilitate guiding the elongated parts and light conductor 96 through the housing 99. The bushings may be formed of resilient material, such as rubber or plastic, for example, to provide a friction fit for the elongated parts and light conductor extending therethrough.

When foamed plastic is employed as the insulation 15 between the inner liner 12 and the outer shell 14 and such insulation is foamed in situ, for example, the body of filling material 100 retained in the housing 99 may also comprise foamed plastic which can be foamed in situ at the same time that the foamed plastic is foamed in situ between the inner liner 12 and the outer shell 14. In such case the body of filling material 100 may be integrally joined to the insulation between the inner liner 12 and outer shell 14. With this construction it will take a longer time for the foamed plastic to harden between the outer shell 14 and platform 98 than it will take for the foamed plastic to harden in front of the platform 98 between the inner liner 12 and outer shell 14. For this reason it is advantageous to employ a body of filling material 100 like corrugated cardboard, for example, in the housing 99 which can be placed in position therein before the foamed plastic is foamed between the inner liner 12 and outer shell 14. In this way the passageways 95a' to 95d' and passageway 96' can be provided in the body of filling material 100 before the insulation is foamed between the inner liner 12 and outer shell 14.

In FIGS. 14, 15 and 16 we have shown a modification of our invention which differs from the embodiments just described and illustrated in FIGS. 5 and 6. In FIG. 14 the platform 198 only extends a part of the distance between the lateral sides of the inner liner 12. As in the embodiments just described, the elongated parts 93 extend from the rear of the cabinet to the panel 194 and are provided with knobs 95 at the front of the panel, as shown in FIG. 15. In FIGS. 15 and 16 it will be seen that the panel 194 extends upward from the platform 198 to provide an article retaining wall 198a. The right hand side of the platform 198, which is intermediate and between the lateral sides of the inner liner 12, may also be provided with an article retaining wall 198b which extends rearward from the right end of the retaining wall 198a formed by the upper part of the panel 194.

Modifications of the embodiments of the invention which we have described and illustrated will occur to those skilled in the art, so that we do not desire to be limited to the arrangements set forth. For example, it also is possible to locate the panel 94 in front of the cabinet 11 instead of within the thermally insulated interior 16 thereof. In such case it will be desirable to position the panel and control knobs in such manner that a part carried by the door and movable therewith will overlie the panel and control knobs when the door is closed and in this way protect these parts from possible injury. Therefore, we intend in the claims to cover all those modifications and features which do not depart from the spirit and scope of our invention.

We claim:

1. The combination of:
   (a) a refrigerator comprising a cabinet having outer walls forming the exterior thereof, said outer walls including horizontal walls defining the top and bottom, respectively, of said cabinet, and vertical walls defining the lateral sides of said cabinet,
   (b) means within said outer walls forming a thermally insulated interior of said cabinet,
   (c) said cabinet having a front access opening and closure means therefor,
   (d) heat-operated absorption refrigeration apparatus comprising a plurality of parts including a generator having a heat receiving member, condenser, cooling structure and an absorber,
   (e) means comprising said cooling structure for cooling the thermally insulated interior of said cabinet,
   (f) said generator, condenser and absorber parts being disposed at the rear of said cabinet,
   (g) means including a gaseous fuel burner for heating said heat receiving member and conduit means for supplying gaseous fuel to said burner from a source of supply, said conduit means having control means for controlling the supply of gaseous fuel to said burner,
   (h) said burner and said conduit means and said control means being disposed at the rear of said cabinet at a level above the bottom thereof,
   (i) said means forming the thermally insulated interior of said cabinet comprising insulated walls including an inner liner which is spaced from said outer walls and insulation between said inner liner and said outer walls,
   (j) said inner liner including a horizontal wall at the bottom of said cabinet, the bottom insulated wall of said cabinet including said last-mentioned horizontal wall of said inner liner and the bottom exterior wall of said cabinet which is spaced therefrom and said insulation therebetween,
   (k) means for operating said control means, said last-mentioned operating means comprising mechanism which is operatively associated with said control means at the rear of said cabinet and includes at least one part extending forward through the rear insulated wall of said cabinet toward the front thereof and between the lateral sides thereof at a level at least above the lowest portion of the bottom insulated wall of said cabinet, and
   (l) means at the forward end of said one part for manually manipulating said mechanism to operate said control means, said last-mentioned manual manipulating means being accessible from the front of said cabinet.

2. The combination set forth in claim 1 which includes means providing a vertically extending panel in the thermally insulated interior of said cabinet, said panel being apertured, the forward end of said one part of said mechanism operatively associated with said control means extending through an aperture in said panel, and said manual manipulating means being fixed to the forward end of said one part in front of said panel and accessible when said closure means at the front access opening of said cabinet is open.

3. The combination set forth in claim 2 which includes structure providing a raised platform at the bottom insulated wall of said cabinet, said panel being disposed at the front of said platform between the access opening of said cabinet and rear insulated wall thereof, and said one part extending forward from the rear insulated wall of said cabinet to said panel beneath said raised platform.

4. The combination set forth in claim 3 in which said platform structure comprises a housing and a body of filling material retained therein.

5. The combination set forth in claim 4 in which said body of filling material is provided with an elongated passageway through which said one part extends.

6. The combination set forth in claim 5 in which said body of filling material comprises two sections in abutting relation and in at least one of which said elongated passageway is formed.

7. The combination set forth in claim 6 in which the two sections of said body of filling material comprise corrugated cardboard united to one another.

8. The combination set forth in claim 3 in which said platform extends from one lateral side of said inner liner to the opposite side thereof.

9. The combination set forth in claim 3 in which said platform extends only a part of the distance between the lateral sides of said inner liner.

10. The combination set forth in claim 3 in which said platform at the front thereof is provided with means forming an article retaining wall.

11. The combination set forth in claim 10 in which said panel projects upward from the platform at the front end thereof and comprises said means forming said article retaining wall.

12. A mobile home having:
(a) an exterior vertical wall and a space at said wall extending vertically upward from a first level in a living area of the home and a vertically extending passageway at said wall which is in communication with outside atmospheric air,
(b) a refrigerator comprising a cabinet having outer walls forming the exterior thereof, said outer walls including horizontal walls defining the top and bottom, respectively, of said cabinet,
(c) means within said outer walls forming a thermally insulated interior of said cabinet,
(d) said cabinet having a front access opening and closure means therefor,
(e) heat-operated absorption refrigeration apparatus comprising a plurality of parts including a generator having a heat receiving member, condenser, cooling structure and an absorber,
(f) means comprising said cooling structure for cooling the thermally insulated interior of said cabinet,
(g) said cabinet being disposed in the vertically extending space in the living area of the home with said horizontal exterior outer wall defining the bottom of said cabinet at the vicinity of the first level of the space,
(h) means comprising said refrigerator to maintain the air in said passageway out of physical contact with air in the living area of the home,
(i) said generator, condenser and absorber parts being disposed in said passageway at the rear of said cabinet,
(j) means including a gaseous fuel burner for heating said heat receiving member and conduit means for supplying gaseous fuel to said burner from a source of supply, said conduit means having control means for controlling the supply of gaseous fuel to said burner, and
(k) said burner and said conduit means and said control means being disposed in said passageway at the rear of said cabinet at a level above the bottom horizontal wall thereof.

13. The combination set forth in claim 12 including:
(a) means for operating said control means, said last-mentioned operating means comprising mechanism which is operatively associated with said control means disposed in said passageway at the rear of said cabinet and includes at least one part extending forward therefrom through said cabinet toward the front thereof at a level above the bottom horizontal outer wall of said cabinet, and
(b) means at the forward end of said one part for manually manipulating said mechanism to operate said control means, said last-mentioned manual manipulating means being accessible from the front of said cabinet.

14. In combination,
(a) a mobile home having an exterior vertical wall and a space therein at said exterior wall, said space having a horizontally disposed bottom at a first level and extending upward therefrom,
(b) a refrigerator comprising a cabinet having outer walls forming the exterior thereof, said outer walls including horizontal walls defining the top and bottom, respectively, of said cabinet and vertical walls defining the lateral sides of said cabinet,
(c) means within said outer walls forming a thermally insulated interior of said cabinet,
(d) said cabinet having a front access opening and closure means therefor,
(e) heat-operated absorption refrigeration apparatus comprising a plurality of parts including a generator having a heat receiving member, condenser, cooling structure and an absorber,
(f) means comprising said cooling structure for cooling the thermally insulated interior of said cabinet,
(g) said generator, condenser and absorber parts being disposed at the rear of said cabinet,
(h) means including a gaseous fuel burner for heating said heat receiving member and conduit means for supplying gaseous fuel to said burner from a source of supply, said conduit means having control means for controlling the supply of gaseous fuel to said burner,
(i) said burner and said conduit means and said control means being disposed at the rear of said cabinet at a level above the bottom thereof,
(j) said cabinet being mounted in said space with said horizontal exterior wall defining the bottom of said cabinet at the bottom of said space at the first level thereof and said generator, condenser and absorber parts at said exterior vertical wall,
(k) a vertical passageway for air at the rear of said cabinet which has an air inlet at one level and an air outlet at a higher level,
(l) said passageway being defined at least in part by the rear exterior wall of said cabinet and a vertical member of the exterior wall of said mobile home which is spaced therefrom,
(m) an element which extends across said passageway and functions to close the bottom thereof, at least a portion of said last-mentioned element being at the first level of said space,
(n) means between the bottom of said cabinet and the bottom of said space at the first level thereof for positioning said cabinet in said space,
(o) said cabinet positioning means comprising a pair of elongated spaced members projecting from said exterior vertical wall into said space at the first level thereof and also projecting across said passageway from the rear wall of said cabinet to the vertical member of the exterior wall of said mobile home, and
(p) said element comprising a sheet of material carried by said elongated spaced members.

15. The combination of:
(a) a refrigerator comprising a cabinet having outer walls forming the exterior thereof, said outer walls including horizontal walls defining the top and bottom, respectively, of said cabinet, and vertical walls defining the lateral sides of said cabinet,
(b) means within said outer walls forming a thermally insulated interior of said cabinet,
(c) said cabinet having a front access opening and closure means therefor,
(d) heat-operated absorption refrigeration apparatus comprising a plurality of parts including a generator having a heat receiving member, condenser, cooling structure and an absorber,
(e) means comprising said cooling structure for cooling the thermally insulated interior of said cabinet,
(f) said generator, condenser and absorber parts being disposed at the rear of said refrigerator, (g) means including a gaseous fuel burner for heating said heat receiving member and conduit means for supplying gaseous fuel to said burner from a source of supply, said conduit means having control means for controlling the supply of gaseous fuel to said burner, (h) said burner and said conduit means and said control means being disposed at the rear of said refrigerator, (i) said means forming the thermally insulated interior of said cabinet comprising insulated walls including an inner liner which is spaced from said outer walls and insulation between said inner liner and said outer walls, (j) said inner liner including a horizontal wall at the bottom of said cabinet, the bottom insulated wall of said cabinet including said last-mentioned horizontal wall of said inner liner and the bottom exterior wall of said cabinet which is spaced therefrom and said insulation therebetween, (k) means for operating said control means, said last-mentioned operating means comprising mechanism which is operatively associated with said control means at the rear of said refrigerator and includes at least one part extending forward through at least one insulated wall of said cabinet toward the front thereof and between the outer vertical walls thereof at a level at least above the lowest portion of the bottom insulated wall of said cabinet, and (l) means at the forward end of said one part for manually manipulating said mechanism to operate said control means, said last-mentioned manual manipulating means being accessible from the front of said cabinet.

16. The combination set forth in claim 15 in which said manual manipulating means is disposed within the thermally insulated interior of said cabinet and accessible when said closure means at the front access opening of said cabinet is open.

17. The combination set forth in claim 16 in which the bottom insulated wall of said cabinet includes a first portion projecting forward from the rear of said cabinet and a second portion projecting forward from said first portion toward the front access opening, said first portion of said bottom insulated wall being of greater depth than said second portion thereof, said one part extending forward from the rear of said cabinet through said first portion of said bottom insulated wall, and said manual manipulating means being disposed in front of said first portion of said bottom insulated wall and above said second portion thereof.

References Cited

UNITED STATES PATENTS

| | | | |
|---|---|---|---|
| 2,489,752 | 11/1949 | Coons | 62—148 X |
| 3,105,363 | 10/1963 | Scher | 62—148 |
| 3,245,224 | 4/1966 | Wilkinson | 62—239 |
| 3,338,066 | 8/1967 | Enger | 62—141 |

LLOYD L. KING, Primary Examiner

U.S. Cl. X.R.

62—244, 457, 476